Patented Dec. 27, 1938

2,141,443

UNITED STATES PATENT OFFICE

2,141,443

PRODUCTION OF GLYCOL DERIVATIVES

Herbert Muggleton Stanley, Tadworth, James Ernest Youell, Wallington, and Gregoire Minkoff, Belmont, England No Drawing. Application January 14, 1937, Serial No. 120,630. In Great Britain January 24, 1936

8 Claims. (Cl. 260—614)

This invention relates to the condensation of olefine oxides with water and/or organic hydroxy componds e. g. monohydric alcohols or phenols.

It has previously been known to condense alcohols and olefine oxides in the presence of (a) acid catalysts, (b) neutral salts as catalysts and (c) in the absence of a catalyst but with the employment of higher temperatures, e. g. above 130° C. and pressures above 10 atmospheres.

It has now been found that the condensation of olefine oxides with water and/or organic hydroxy compounds may be brought about in a rapid, efficient and smooth manner by the use, as catalysts, of dehydrating metal oxides, as, for example, alumina, thoria, or oxides of tungsten, titanium, vanadium, molybdenum or zirconium.

The condensation is carried out in the liquid phase and under conditions of temperature and pressure suited to maintain such phase. For example, we have found that the condensation of ethylene oxide and ethyl alcohol proceeds rapidly at temperatures between 80° and 120° C. and pressures between 5 and 15 atmospheres in the presence of activated alumina or tungstic oxide.

The oxide catalyst may conveniently be in granular form and be packed in a tube through which the reactants are passed. If desired the activity of the catalyst may be controlled by means of supports, carriers or inactive dispersing agents.

The resultant product of the condensation in the case of ethylene oxide and ethyl alcohol is mainly ethylene glycol monoethyl ether. Similarly by varying the olefine oxide and the organic hydroxy compound used, other glycol derivatives may be obtained. In the case of using water, instead of an organic hydroxy compound, with an olefine oxide, the corresponding glycol or polyglycol is produced.

The following typical results were obtained by liquid phase operation in a small continuous apparatus on which a solution of ethylene oxide in the hydroxy reactant compound (the latter being present in excess) was pumped under superatmospheric pressure through a preheater coil and then through a catalyst chamber in the form of a tubular reactor containing the catalyst and heated externally to the required temperatures by means of an electric furnace. The liquid products of reaction passed then to a cooler and through a reducing valve where the pressure was let down to atmospheric pressure. The temperatures and pressures used varied somewhat with different catalysts but usually a preheater temperature of about 80° C. was used and a catalyst chamber internal temperature of 90°–95° C. so that pressures of the order of 7–10 atmospheres were suitable when employing ethylene oxide concentrations up to 100 gms. per litre. The pressure employed was always sufficient to maintain the reaction mixture entirely in the liquid phase.

*Example 1.*—A catalyst was prepared by precipitating aluminium hydroxide by ammonia from an aqueous solution of aluminium nitrate, the gelatinous mass being thoroughly washed by repeated decantations with boiling water and then filtered. The resulting mass was extruded and the extruded granules were dried first at 100° C. and then finally at 300° C. for 2 hours. A solution of ethylene oxide in anhydrous ethyl alcohol, and containing initially 90.6 gms. of ethylene oxide per litre of solution was preheated and passed at a rate of about 500 cc. of liquid mixture per hour, over 300 cc. of this partially dehydrated alumina contained in a tubular reactor. The preheater temperature was 100° C. and the catalyst temperature averaged about 110° C., the operating pressure being 12–14 atmospheres. Under these conditions the total conversion of ethylene oxide per passage was 95 per cent. On distilling the reaction products, there was obtained, after removal of excess ethyl alcohol and unchanged ethylene oxide, a mixture containing 52% by weight of ethylene glycol monoethyl ether and 48% of higher boiling products including diethylene glycol monoethyl ether.

*Example 2.*—A titania catalyst was prepared by mixing 250 g. of $TiO_2$ in the form of washed precipitated titanium hydroxide with a solution containing 100 cc. ethyl alcohol, 100 cc. of silicon ester and 20 cc. of aqueous ammonia (DO.88), the resulting mass being allowed to set hard and then broken up into granules which were finally baked at 300° C. for 2 hours. When a solution of ethylene oxide in anhydrous ethyl alcohol containing initially 91.5 gms. of ethylene oxide per litre of solution was continuously passed over 300 cc. of this catalyst under similar operating conditions to those used in Example 1, 90% of the ethylene oxide present was converted in one passage and the reaction products, after removal of excess ethyl alcohol and unchanged ethylene oxide, consisted of 77% by weight of ethylene glycol monoethyl ether and 33% of higher boiling products.

*Example 3.*—An aqueous solution of zirconium nitrate was treated with excess of ammonia and the resulting precipitate was thoroughly washed with water and filtered. The gelatinous material was extruded and the extruded granules were dried at 100° C. for several days and finally baked at 300° C. for 2 hours. A solution of ethylene oxide in anhydrous ethyl alcohol containing initially 84 gms. of ethylene oxide per litre of solution was passed in a continuous manner at the rate of 500 cc. per hour over 300 cc. of the zirconia granules at a temperature of about 100° C. and under a pressure of approximately 10 atmospheres. Under these conditions 80% of the ethylene oxide present was continuously reacted and the product, after removal of excess ethyl alcohol and ethylene oxide, contained 83.5% by weight of ethylene glycol monoethyl ether, 10% by weight of diethylene glycol monoethyl ether and 5.5% of higher boiling products.

*Example 4.*—A solution of ethylene oxide in anhydrous ethyl alcohol was passed under similar conditions to those described in Example 2 over 300 cc. of the zirconia catalyst described in Example 3. The conversion of the ethylene oxide per passage was about 95% and the reaction products, after removal of excess alcohol and ethylene oxide, contained 89.5% by weight of ethylene glycol monoethyl ether and 10.5% of higher boiling products.

*Example 5.*—A catalyst of yellow tungstic acid ($H_2WO_4$) was prepared by decomposing a strong aqueous solution of sodium tungstate (or a suspension of ammonium tungstate) with a hot mixture of 2 volumes of strong hydrochloric acid and 1 volume of strong nitric acid. The yellow product was thoroughly washed with water until free from mineral acids and dried at 100° C. for several days after which it was broken up into granules or formed into tablets. Over 300 cc. of granules of this catalyst at about 90° C. was passed in the continuous unit, a solution of ethylene oxide in anhydrous ethyl alcohol, containing about 50 gms. of ethylene oxide per litre of solution at a rate of about 750 cc. per hour and under a pressure of 10 atmospheres. The average conversion of ethylene oxide per passage during a continuous run lasting more than one week was about 90% and the products of reaction contained (after removal of excess ethyl alcohol and ethylene oxide) 83–86% by weight of ethylene glycol monoethyl ether and 17–14% of higher boiling products.

*Example 6.*—Granules of yellow tungstic acid, prepared as described in Example 5, were treated with a slow stream of a gaseous, approximately equimolecular mixture of hydrogen, alcohol and steam in a silica tube heated in an electric furnace at about 150° C. After ½ hour, the temperature was raised to 175° C., maintained for a further ½ hour at that temperature, raised further to 200° C. for another ½ hour and then finally raised to 250° C. where it was maintained constant for 1 hour. The resulting bluish mass was then allowed to cool in a slow current of hydrogen and immediately placed in a continuous catalyst unit. The following results were obtained by passage of various mixtures of ethylene oxide and anhydrous ethyl alcohol at a rate of about 750 cc. per hour over 300 cc. of catalyst maintained at about 85–90° C. and at a working pressure of about 8 atmospheres.

| Inlet concentration of ethylene oxide, grams per litre | Percent conversion of ethylene oxide per passage | Composition of products (free from excess alcohol and ethylene oxide) | |
|---|---|---|---|
| | | Percent by weight of ethylene glycol monoethyl ether | Percent of higher products |
| 51.0 | 92 | 85 | 15 |
| 30.0 | 88 | 89.5 | 10.5 |
| 20.0 | 87 | 93.6 | 6.4 |

Catalysts of this type, prepared by treating yellow tungstic acid with ethyl alcohol vapor or other reducing vapors or gases at temperatures up to 300° C. whereby partial dehydration and/or reduction occurs, have been used in continuous experiments lasting as long as 6 weeks without appreciable reduction in catalytic activity.

*Example 7.*—Over 300 cc. of granules of a catalyst of yellow tungstic acid prepared as described in Example 5 but rendered mechanically more stable by admixture with a mixture of 100 cc. of silicon ester, 100 cc. of alcohol and 25 cc. of water prior to drying at 100° C. for several days, was passed a solution of ethylene oxide (92 gms. per litre) in dry isopropyl alcohol at a total rate of 500 cc. of liquid mixture per hour, the catalyst temperature being about 90°–95° C. and the working pressure 10–12 atmospheres. The conversion of ethylene oxide per passage was 98% and the product (after removal of excess isopropyl alcohol) contained 48% by weight of ethylene glycol mono-isopropyl ether and 52% of higher boiling products.

*Example 8.*—A solution of ethylene oxide in n-butanol containing 91 gms. of ethylene oxide per litre was passed over the tungstic acid ($H_2WO_4$) catalyst described in Example 7, under similar conditions to those already mentioned. The conversion of ethylene oxide was 87% per passage, and the reaction products (after removal of excess n-butanol and unchanged ethylene oxide) consisted of 70% of ethylene glycol mono-n-butyl ether and 30% of higher boiling products.

*Example 9.*—On passing a solution of ethylene oxide in ethylene glycol mono-ethyl ether containing 99 gms. of ethylene oxide per litre, over the same catalyst and under the same conditions as described in Example 7, 90% of the ethylene oxide was consumed per passage and the reaction products (after removal of unchanged reactants) consisted of 73% by weight of diethylene glycol monoethyl ether and 27% of higher boiling products.

*Example 10.*—On passing an aqueous solution of ethylene oxide containing 54 gms. of ethylene oxide per litre over the same catalyst and under similar conditions to those described in Example 7, 85% of the ethylene oxide present was consumed in a single treatment, and the reaction products, after removal of excess of water and unchanged ethylene oxide, contained 90% by weight of ethylene glycol and 10% of higher boiling products consisting mainly of diethylene glycol. The above described reactions are exothermic, the approximate thermal effects in the liquid phase varying from 20 to over 30 kg. cal per molecule of ethylene oxide reacted.

In carrying out the reaction on an industrial scale it is advantageous to make use of the rise in temperature resulting from the heat of reaction to carry the reaction almost to completion, i. e. to operate the reaction chamber with a temperature gradient along it so that the liquid temperature is rising as the ethylene oxide concentration falls. In this way the reaction velocity can be maintained at a high value in spite of diminishing ethylene oxide concentration. When using a sufficient excess of the hydroxylated reactant (e. g. ethyl alcohol), the rise in temperature resulting from the heat of reaction is not sufficiently great to impair the catalyst activity.

Very suitable catalysts from the view point of long life and high activity are those made by treating yellow tungstic acid ($H_2WO_4$) with alcohol vapor or with a mixture of alcohol vapor and steam (preferably with addition of hydrogen as carrier gas) at temperatures up to 300° C. This treatment results in partial dehydration possibly to an intermediate stage such as $H_2W_2O_7$, together with some reduction to the blue oxide which, however, is probably not an essential constituent of the catalyst mass. The completely dehydrated oxide ($WO_3$) is also relatively inactive when prepared by dehydration of $H_2WO_4$ at high temperatures in the presence of nitrogen. We therefore do not limit ourselves to the exact composition and mode of activity of this highly effective catalyst.

What we claim is:—

1. The condensation of olefine oxides with a hydroxylated reactant selected from the group consisting of water, alcohols and phenols, comprising essentially reacting the components in the presence of a dehydrating metal oxide as catalyst under conditions of temperature and pressure suited to maintain the liquid phase during the reaction.

2. The condensation of olefine oxides with a hydroxylated reactant selected from the group consisting of water, alcohols and phenols, comprising essentially reacting the components in the presence of a metal oxide partially hydrated but functioning as a dehydration catalyst under conditions of temperature and pressure suited to maintain the liquid phase during the reaction.

3. The condensation of olefine oxides with a hydroxylated reactant selected from the group consisting of water, alcohols and phenols, comprising essentially reacting the components in the presence of yellow tungstic oxide as catalyst under conditions of temperature and pressure suited to maintain the liquid phase during the reaction.

4. The production of ethylene glycol monoethyl ether by condensation of ethylene oxide and ethyl alcohol, comprising essentially reacting the components in the presence of a dehydrating metal oxide as catalyst under conditions of temperature and pressure suited to maintain the liquid phase during the reaction.

5. The production of ethylene glycol monoethyl ether by condensation of ethylene oxide and ethyl alcohol, comprising essentially reacting the components in the presence of a dehydrating metal oxide as catalyst at a temperature between 80° C. and 100° C. and a pressure between five and fifteen atmospheres.

6. The condensation of olefine oxides with a hydroxylated reactant selected from the group consisting of water, alcohols and phenols, comprising essentially reacting the components in the presence of a dehydrating metal oxide in granular form packed in a reaction tube as catalyst under conditions of temperature and pressure suited to maintain the liquid phase during the reaction.

7. The condensation of olefine oxides with a hydroxylated reactant selected from the group consisting of water, alcohols and phenols, comprising essentially dissolving the olefine oxide in excess of the hydroxy component, and reacting the components in the presence of a dehydrating metal oxide as catalyst under conditions of temperature and pressure suited to maintain the liquid phase during the reaction.

8. The condensation of olefine oxides with a hydroxylated reactant selected from the group consisting of water, alcohols and phenols, comprising essentially reacting the components in the presence of a catalyst comprising essentially a dehydrating metal oxide under conditions of temperature and pressure suited to maintain the liquid phase during the reaction.

HERBERT MUGGLETON STANLEY.
JAMES ERNEST YOUELL.
GREGOIRE MINKOFF.